May 23, 1950     R. F. TULL     2,508,697
CEMENT MIXER

Filed Feb. 26, 1947     2 Sheets-Sheet 1

INVENTOR
R. F. Tull
BY
Glascock Downing & Seebold
Attys

May 23, 1950 R. F. TULL 2,508,697
CEMENT MIXER
Filed Feb. 26, 1947 2 Sheets-Sheet 2
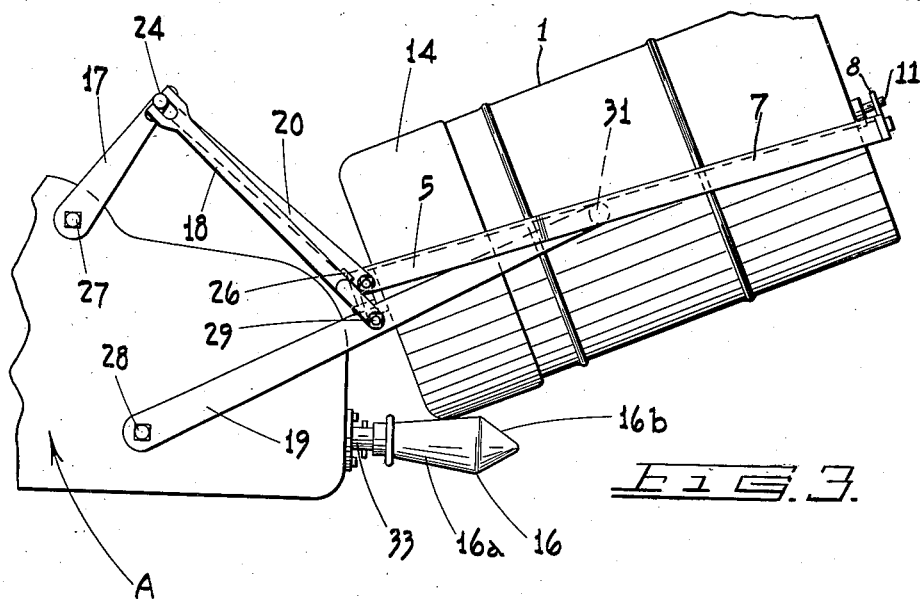
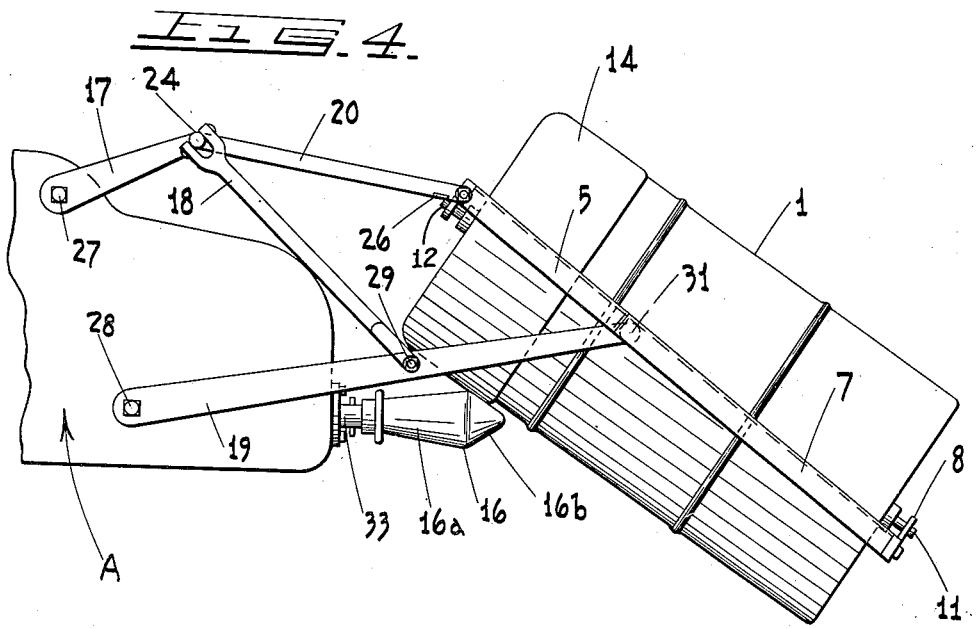
INVENTOR
R. F. Tull
BY
Glascock Downing Reek &
Attys Patented May 23, 1950

2,508,697

UNITED STATES PATENT OFFICE 2,508,697

CEMENT MIXER

Russell Frederick Tull, Malahat, British Columbia, Canada

Application February 26, 1947, Serial No. 730,906

4 Claims. (Cl. 259—177)

The present invention relates to cement-mixers.

It is an object of the invention to devise a cement-mixing unit of simple design that may conveniently be attached to an ordinary tractor or similar driving means.

Around the average farm or market-garden it is necessary at certain times to do a considerable amount of cement work but the cost of a complete cement- or concrete-mixing unit might be considered to be too great in view of the fact that such a machine would be used at infrequent intervals. Such would not be the case however with the device made according to present invention. Applicant's cement-mixer is relatively inexpensive and since it may be put to a variety of uses in addition to that of mixing concrete it need not be looked on as a luxury item.

The invention consists in the construction, combination and arrangement of parts hereinafter described and more particularly pointed out in the appended claims.

The invention will now be described by way of example with reference to the accompanying drawings in which:

Figure 3 is a side view of the unit in mixing position, and

Figure 4 is a side view of the unit in emptying position.

Figure 1:
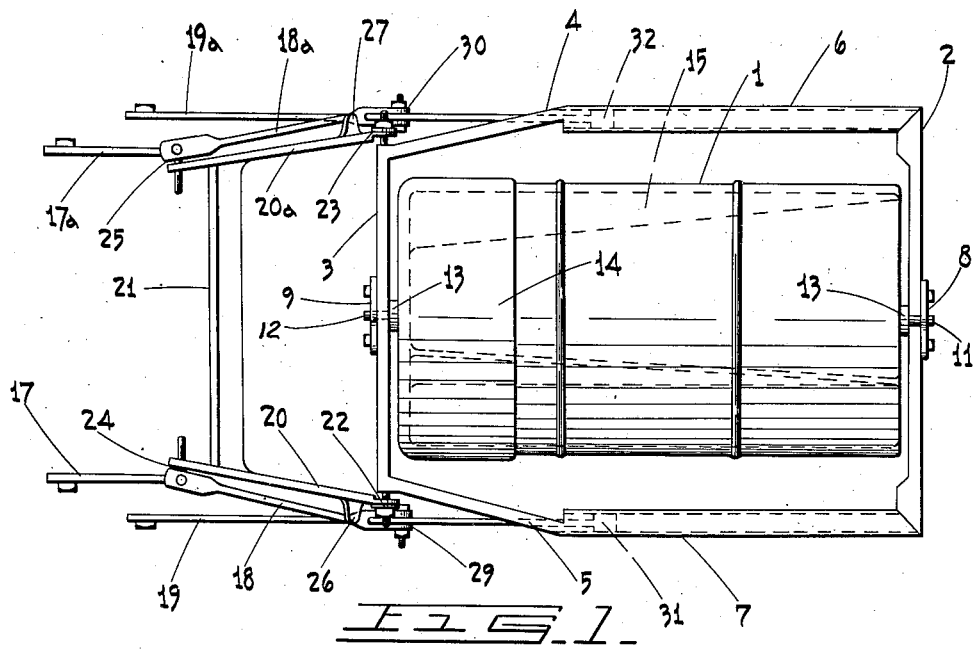
Figure 1 is a plan view of the mixing unit and the hoisting mechanism.
Figure 2:
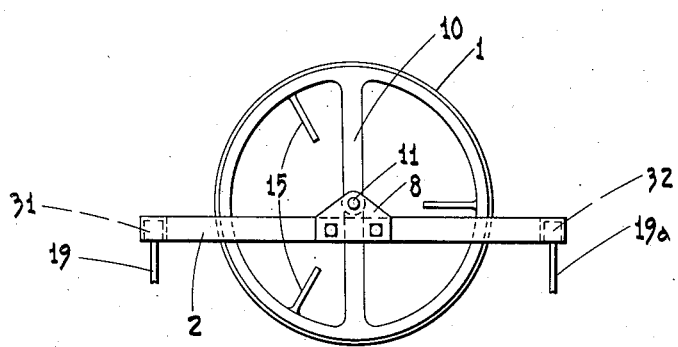
Figure 2 is an end view of the drum showing the interior thereof.

A drum 1 is rotatably mounted within a section of a frame the members of which are preferably made of metal and comprising a front member 2, a rear member 3, and side members 4 and 5. For a portion of their length the side members 4 and 5 may take the form of inverted metal channels 6 and 7. Metal plates 8 and 9 are secured to the front member 2 and the rear member 3, respectively, of the frame section.

A reinforcing bar 10 is secured to the front or open end of the drum 1 preferably by means of welding. A similar bar (not shown) may be welded to the rear end of said drum. Metal pins or studs 11 and 12 are in turn welded to these bars, the one at the front and the other at the rear of the drum. The pins 11 and 12 are journalled in metal plates 8 and 9 respectively, the plates acting as the bearings within which the pins turn and through which the drum revolves. Washers 13 are mounted on the pins between the drum and the frame members 2 and 3.

At its rear end and over a portion of its length the drum is covered by one or more thicknesses of webbing or belting 14.

Fins 15 are secured within the drum and extend radially and are preferably tapered from rear to front thereof.

In frictional relationship with the material 14 on the rear of the drum 1 is a driving or impelling member 16 which may be an extension of the power take-off unit of a tractor or of any other suitable driving means. As an extension of the power take-off of a tractor the member 16 may be in the form of a rubber-covered spline socket designed to slide over the shaft 33 of the tractor. The member is bevelled at 16a and 16b.

The drum 1 may be raised and lowered by means of the hoisting mechanism of the tractor acting through the frame members of the sectional frame. The frame members 2, 3, 4, 5, 6 and 7 make up one section of the frame while members 20, 20a and 21 make up the other section of the frame. The hoisting mechanism comprises arms 17, 17a, 18, 18a, 19 and 19a and these act through frame members 20, 20a, 3, 4, 5, 6 and 7. The frame members 20 and 20a extend rearwardly of the drum 1 and are connected and reinforced by means of a transverse bar 21. The members 20 and 20a are pivotally connected at the ends of member 3 at points 22 and 23 respectively and together with members 18 and 18a are pivotally coupled to one end of each of the members 17 and 17a at points 24 and 25 respectively. A supporting lug 26 is carried by member 20 and a supporting lug 27 by member 20a.

The tractor is designated generally at A in Figures 3 and 4, the arms or members 17 and 19 being pivotally connected thereto at points 27 and 28 respectively. The arms or members 17a and 19a are similarly connected but these connections are not shown.

The arms or members 18 and 19 are pivotally connected at a point 29 intermediate the ends of member 19 and similarly for arms or members 18a and 19a which are pivotally connected at a point 30 on member 19a.

The end 31 of arm 19 and the end 32 of arm 19a are free to move in the metal channels 7 and 6 respectively.

The mixing unit is used in the conventional manner in the mixing of concrete. The tapered fins 15 extending diagonally over the length of the drum tend to throw the mix forward as the drum revolves and thus assist in the producing of a homogeneous mixture. The fins also facilitate the emptying of the drum when the mixing operation has been completed.

In Figure 3 the drum is shown in the raised or operative position while in Figure 4 it is shown in the lowered or dumping position. The arm 17 is suitably powered and to lower the drum from the position in Figure 3 to that in Figure 4 it is merely necessary to lower the arms 17 and 17a by moving them forward. This movement of the arms 17 and 17a has the effect of lowering the arms 18 and 18a and 19 and 19a and at the same time the frame members 20 and 20a move upwardly and lift the frame section comprising members 20, 20a and 21 thus causing the rear end of the frame section comprising members 2, 3, 4, 5, 6 and 7 to tilt upwardly and the front end of that frame section to tilt downwardly thereby causing the rear end of the drum to tilt upwardly and the front end to tilt downwardly. At no time is the webbing 14 at the rear of the drum out of contact with the driving member 16.

The raising of the drum and of the frame section within which it is mounted is of course the reverse of the lowering operation. When the drum is in the raised position its weight which would ordinarily be borne by the driving member 16 is carried almost entirely by lugs 26 and 27. These lugs are secured to the members 20 and 20a and come into engagement with the arms 18 and 18a as the drum is raised to the mixing position shown in Figure 3.

The only fixed connections between the frame and the hoisting means are the couplings shown at points 24 and 25. When the couplings at these points are removed the drum, together with the sectional frame may be removed from the tractor.

The foregoing description is presented by way of example only and not in any limiting sense. Modifications to any degree may be made within the scope of the appended claims.

What is claimed is:

1. A mixing device comprising a sectional frame, one of the sections being substantially rectangular in shape, an open-ended drum rotatably mounted in said rectangular section of said frame, arms adapted at one end to engage slidably with the under side of said section of frame, a pair of rearwardly extending links pivotally connected to said arms, a second pair of rearwardly extending links pivotally connected to said section of said frame, said second pair of links being members of another section of said frame, said pairs of links being pivotally connected at their rear ends, operating arms pivotally connected to the rear ends of said links, and a driving member in constant frictional contact with the rear end of said drum.

2. A device as claimed in claim 1, wherein said driving member is provided with two conical driving surfaces tapering in opposite directions.

3. In conjunction with a conventional tractor a device for mixing concrete comprising a sectional frame movably and removably secured to hoisting means on said tractor, rotatable elements mounted and suitably journalled in a plurality of members of one section of said frame, a hollow drum fixedly mounted on said rotatable elements, agitating means mounted within said drum, a plurality of supporting means secured to members of another section of said frame and impelling means mounted in frictional relationship with said drum and wherein a plurality of other members of the first-mentioned section of said frame comprise track means designed to accommodate parts of said hoisting means, the section of said frame within which said rotatable elements and said drum are mounted being tiltably secured to the section of said frame to which said supporting means are attached.

4. In conjunction with a conventional tractor a device for mixing concrete comprising a sectional frame movably and removably secured to hoisting means on said tractor, rotatable elements mounted and suitably journalled in a plurality of members of one section of said frame, a hollow drum fixedly mounted on said rotatable elements, agitating means mounted within said drum, a plurality of supporting means secured to members of another section of said frame and impelling means mounted in frictional relationship with said drum, said supporting means consisting of lugs secured to and extending outwardly from the said members of said other section of said frame and designed to come into engagement with said hoisting means on said tractor, the section of said frame within which said rotatable elements and said drum are mounted being tiltably secured to the section of said frame to which said supporting means are attached.

RUSSELL FREDERICK TULL.

REFERENCES CITED

The following references are of record in the file of this patent:

UNITED STATES PATENTS

| Number | Name | Date |
|---|---|---|
| 978,320 | McDonald | Dec. 13, 1910 |
| 1,725,682 | St. John | Aug. 20, 1929 |
| 1,781,823 | Robbins | Nov. 18, 1930 |
| 2,397,851 | Gaertner | Apr. 2, 1946 |